(12) United States Patent  
Zhou

(10) Patent No.: US 9,056,555 B1  
(45) Date of Patent: Jun. 16, 2015

(54) VEHICLE CHARGE ROBOT

(71) Applicant: Wesley Zhou, Laguna Niguel, CA (US)

(72) Inventor: Wesley Zhou, Laguna Niguel, CA (US)

( * ) Notice: Subject to any disclaimer, the term of this patent is extended or adjusted under 35 U.S.C. 154(b) by 0 days.

(21) Appl. No.: 14/519,942

(22) Filed: Oct. 21, 2014

(51) Int. Cl.  
*H02J 7/00* (2006.01)  
*H02J 7/14* (2006.01)  
*B60L 11/18* (2006.01)

(52) U.S. Cl.  
CPC ......... *B60L 11/1827* (2013.01); *B60L 11/1816* (2013.01); *Y10S 901/09* (2013.01); *Y10S 901/01* (2013.01); *Y10S 901/23* (2013.01); *Y10S 901/47* (2013.01)

(58) Field of Classification Search  
USPC ................. 320/109, 137, 149, 104, 108, 107; 307/10.1; 180/65.1  
See application file for complete search history.

(56) References Cited

U.S. PATENT DOCUMENTS

| | | | |
|---|---|---|---|
| 5,208,753 | A | 5/1993 | Acuff |
| 5,300,869 | A | 4/1994 | Skaar et al. |
| 6,014,597 | A * | 1/2000 | Kochanneck .................... 701/22 |
| 6,194,860 | B1 | 2/2001 | Seelinger et al. |
| 7,999,506 | B1 * | 8/2011 | Hollar et al. ................... 320/104 |
| 2007/0276539 | A1 | 11/2007 | Hbibi et al. |
| 2009/0079388 | A1 * | 3/2009 | Reddy ........................... 320/109 |
| 2012/0043935 | A1 * | 2/2012 | Dyer et al. .................... 320/109 |
| 2012/0286730 | A1 * | 11/2012 | Bonny ........................... 320/109 |
| 2013/0076902 | A1 * | 3/2013 | Gao et al. ...................... 348/148 |
| 2014/0354229 | A1 * | 12/2014 | Zhao et al. .................... 320/109 |

* cited by examiner

*Primary Examiner* — Edward Tso  
*Assistant Examiner* — Alexis A Boateng  
(74) *Attorney, Agent, or Firm* — Greenberg Traurig, LLP; Franklin D. Ubell

(57) ABSTRACT

A robotic electric vehicle charging device operable to automatically plug in an electric charging connector to charge the battery pack of an electrically powered vehicle. When charging is completed, the device will disconnect itself from the vehicle and move away from the vehicle.

20 Claims, 16 Drawing Sheets

VEHICLE CHARGE ROBOT

BACKGROUND OF THE INVENTION

1. Field of the Disclosure

The subject disclosure relates to a self connecting electric vehicle charging device that automatically inserts and plugs in an electric charging connector to charge the battery pack of an electrically powered vehicle. When charging is completed the device disconnects itself from the vehicle and moves away from the vehicle.

2. Related Art

Charging stations for charging the battery packs of electrically powered vehicles have been proposed in the past.

SUMMARY

The following is a summary of description of illustrative embodiments of an electrical vehicle charging robot. It is provided as a preface to assist those skilled in the art to more rapidly assimilate the detailed design discussion which ensues and is not intended in any way to limit the scope of the claims which are appended hereto in order to particularly point out the invention.

A robot according to an illustrative embodiment has a base on top of which is mounted a robotic arm which carries a (SAE 1772 or other) connector that can plug into a corresponding socket on a vehicle. There is an indicator light on a short extension that can be seen easily by the driver inside the vehicle.

According to an illustrative implementation, the driver of the vehicle proceeds with parking the vehicle as normal and operates the release latch of the charging door if so equipped. The robot then proceeds to locate the charging connector socket of the vehicle using video cameras. The robot then moves into a position where the charging connector can reach the charging connector on the vehicle. As soon as charging is complete, the robot disconnects from the vehicle and moves out of the way.

DETAILED DESCRIPTION

Figure 1:
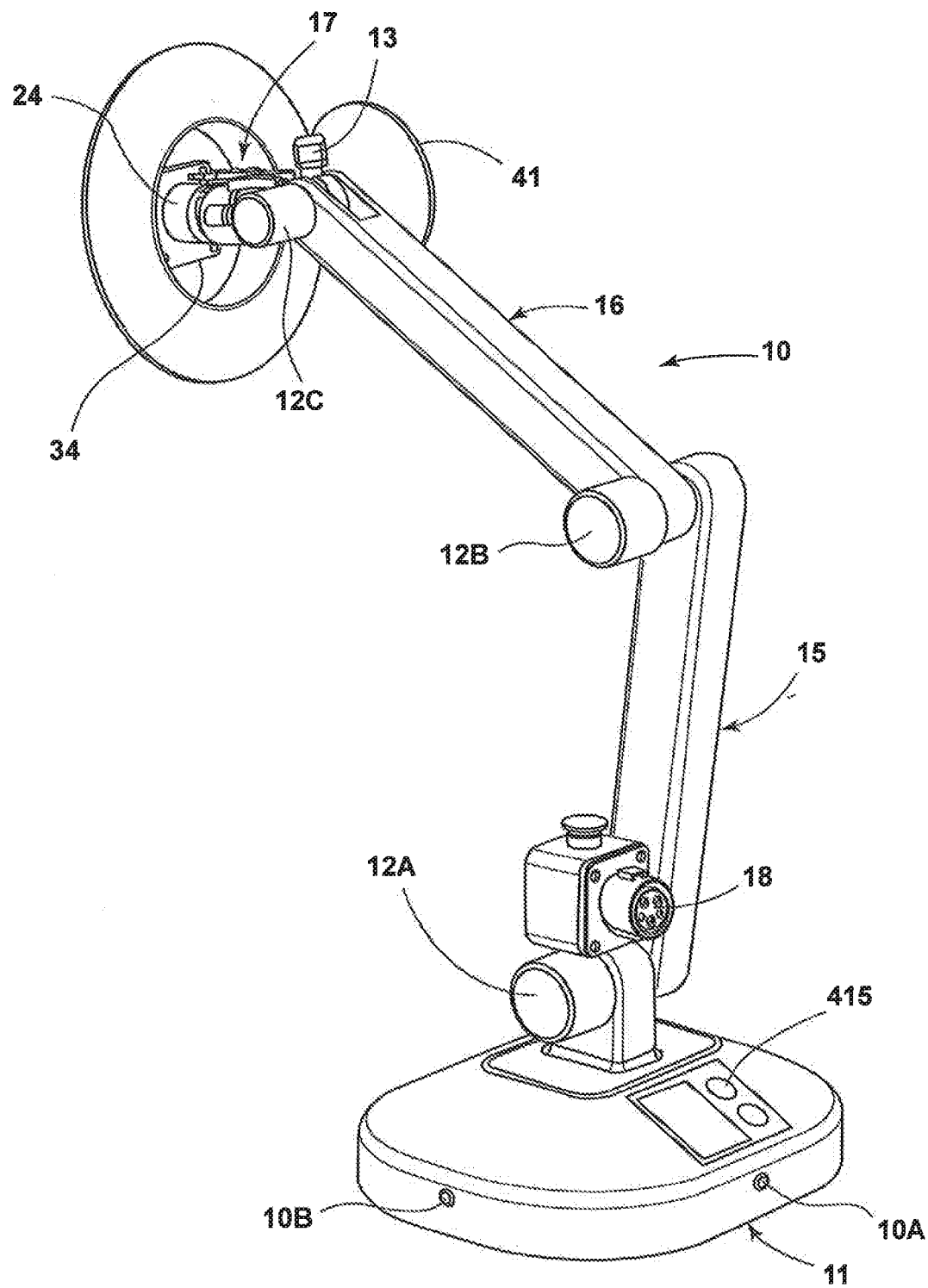
FIG. 1 is side perspective view of an illustrative embodiment of a Car Charge Robot.
Figure 2:
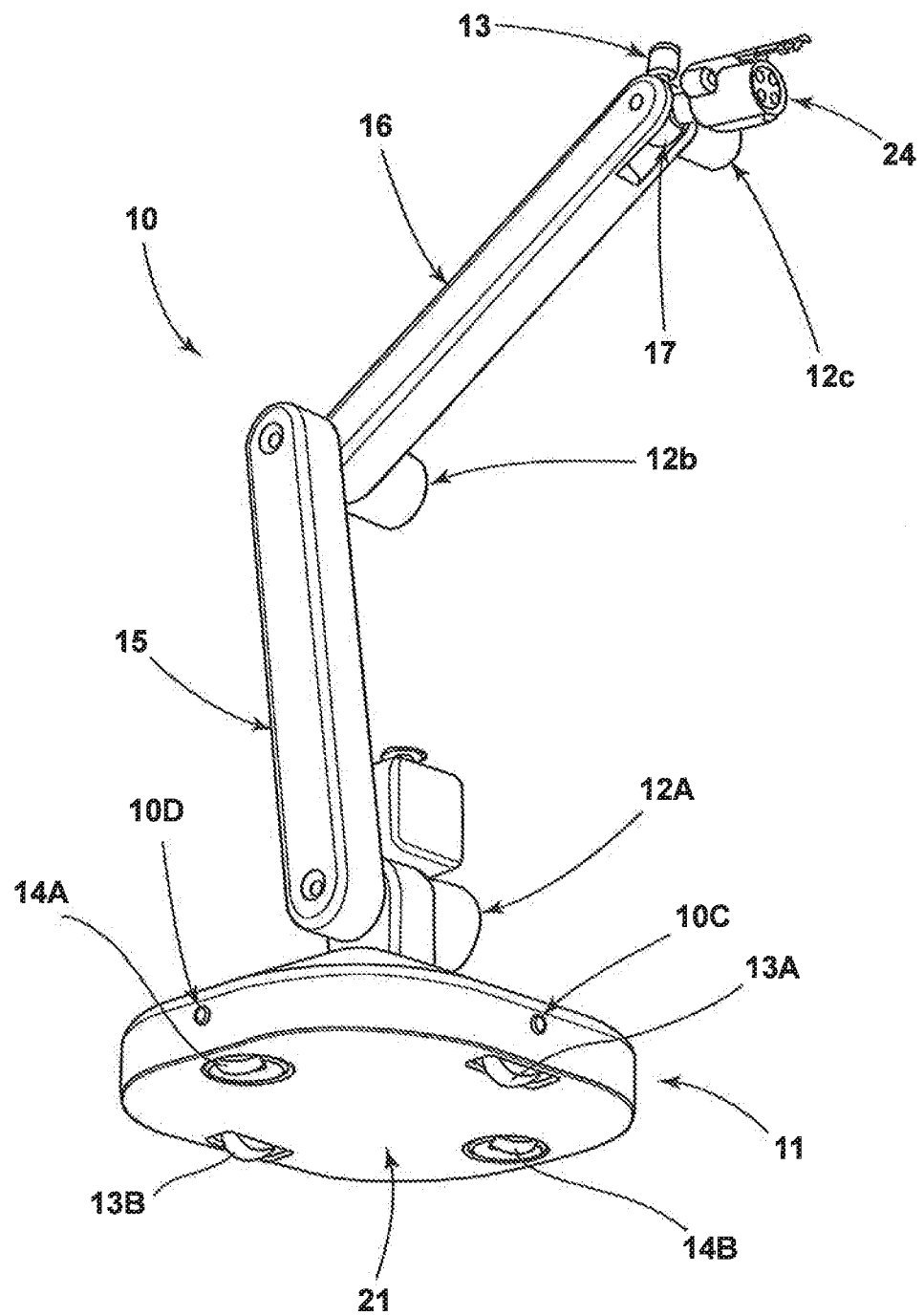
FIG. 2 is a perspective view looking upwardly at an illustrative embodiment of the Car Charge Robot of FIG. 1.
Figure 3:
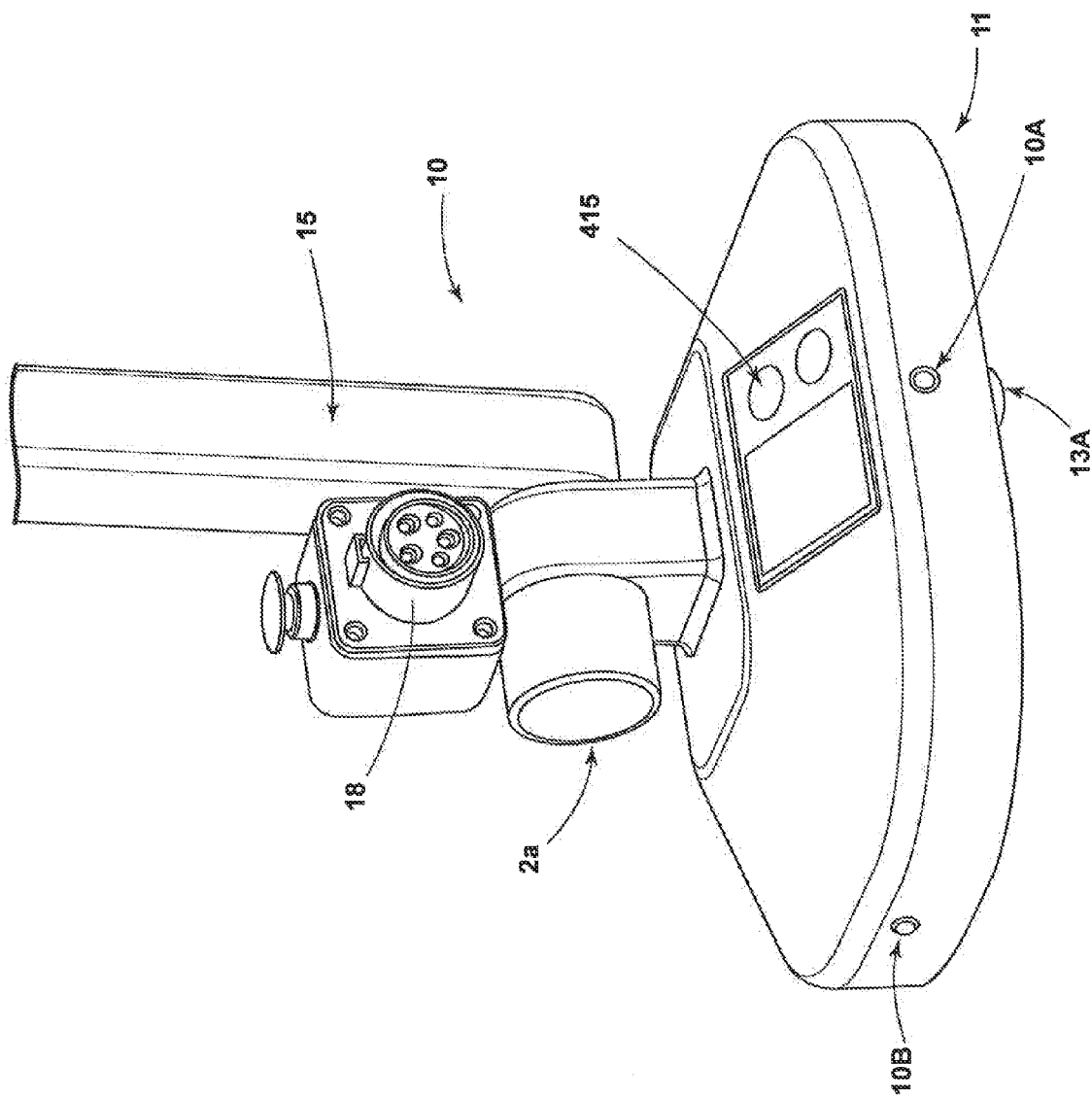
FIG. 3 is a fragmentary perspective view of the base of the illustrative embodiment of the Car Charge Robot of FIG. 1.
Figure 4:
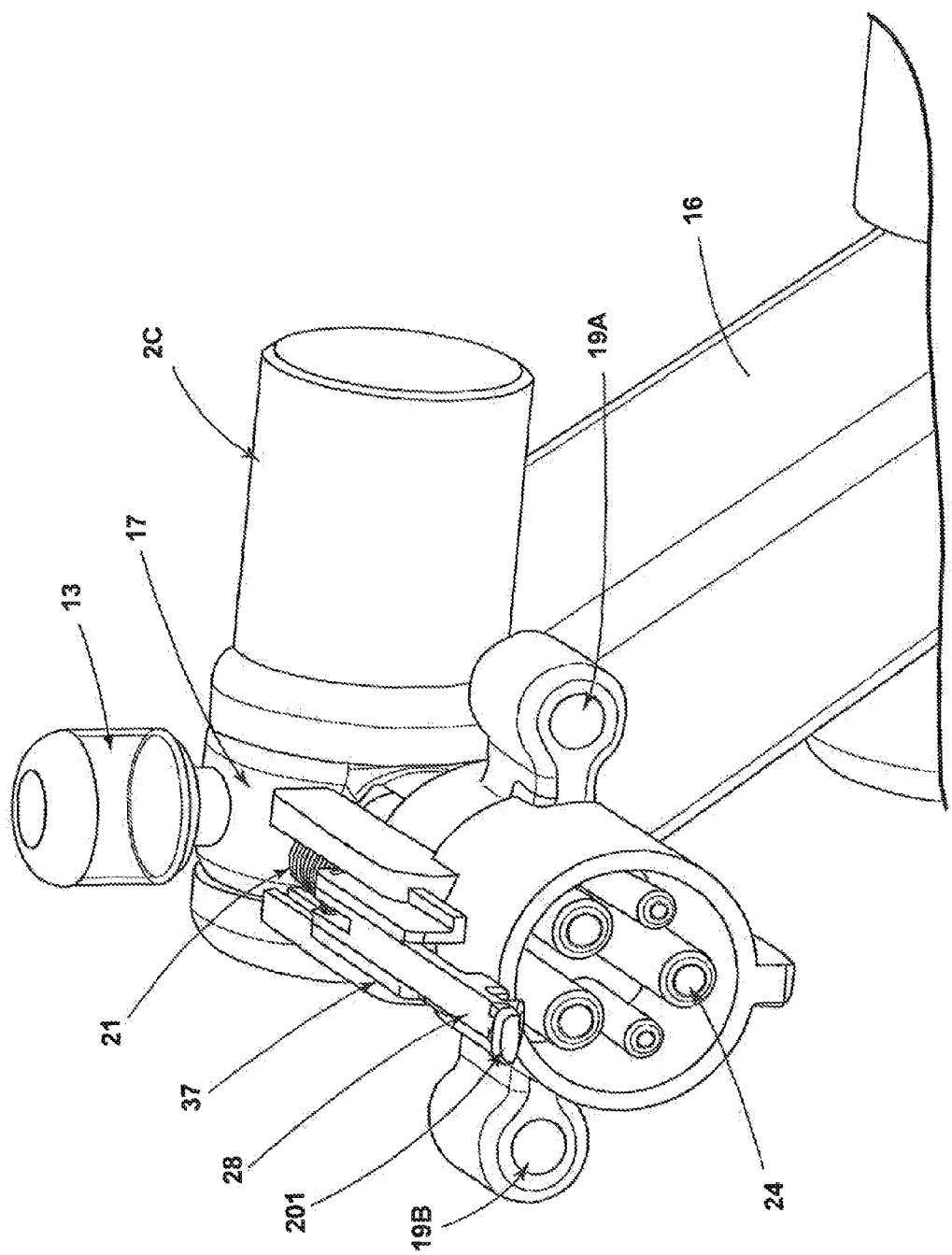
FIG. 4 is a fragmentary perspective view of a charging mechanism of an illustrative embodiment of the Car Charge Robot.
Figure 5:
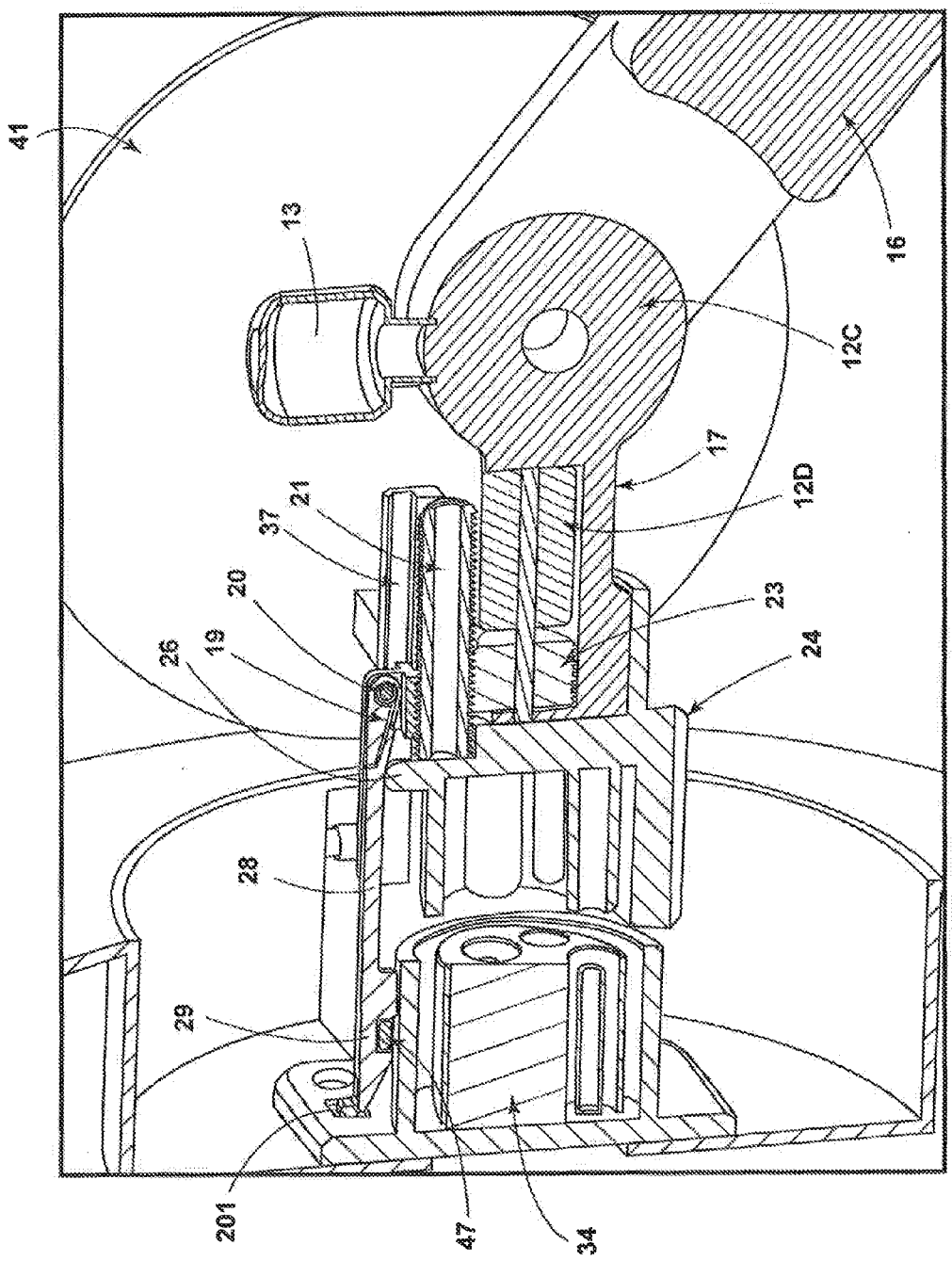
FIG. 5 is a side sectional view of the charging mechanism of FIG. 4.
Figure 6:
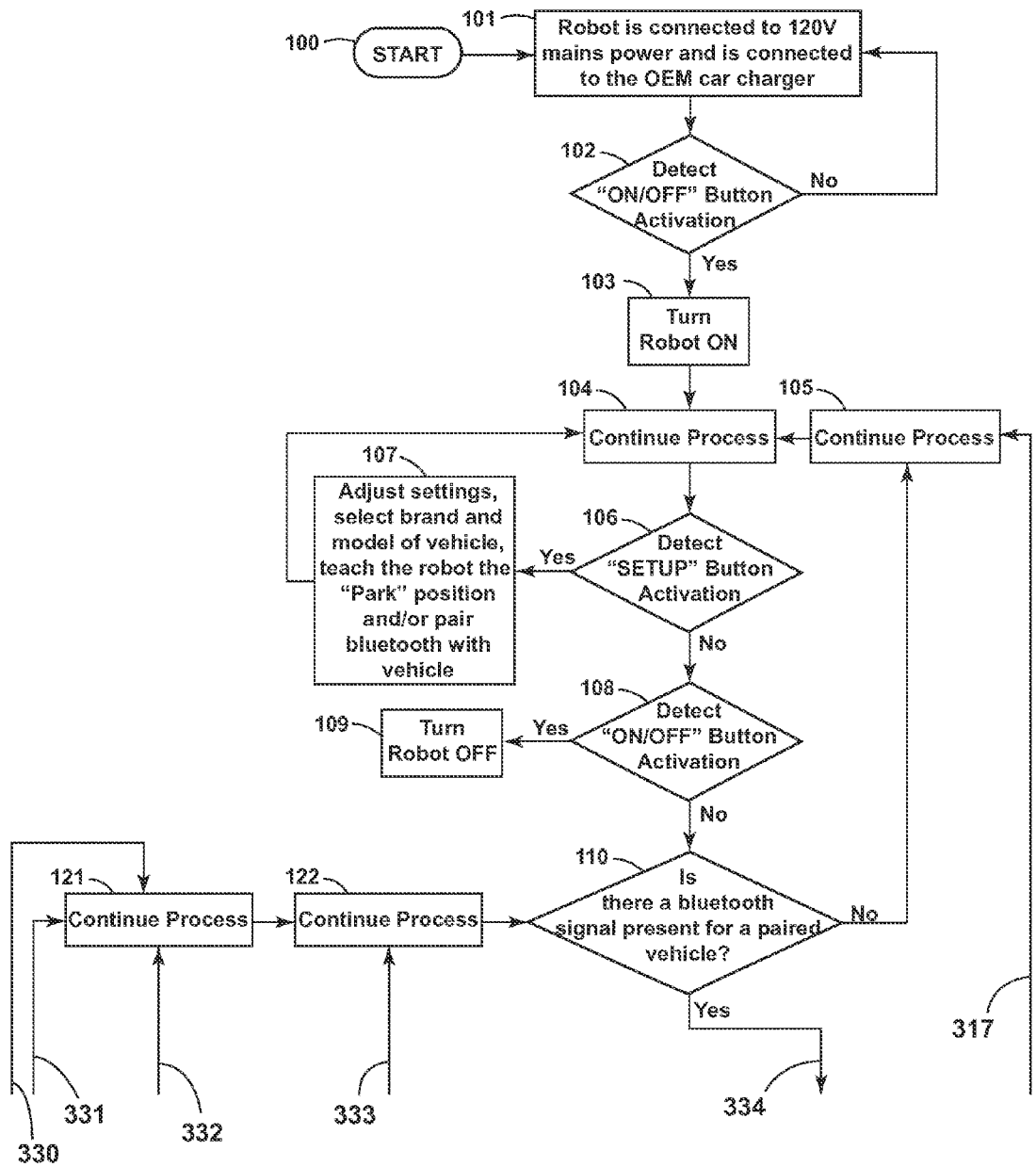
FIG. 6 is a first portion of a flow diagram illustrating operation of an illustrative embodiment of the Car Charge Robot.
Figure 7:
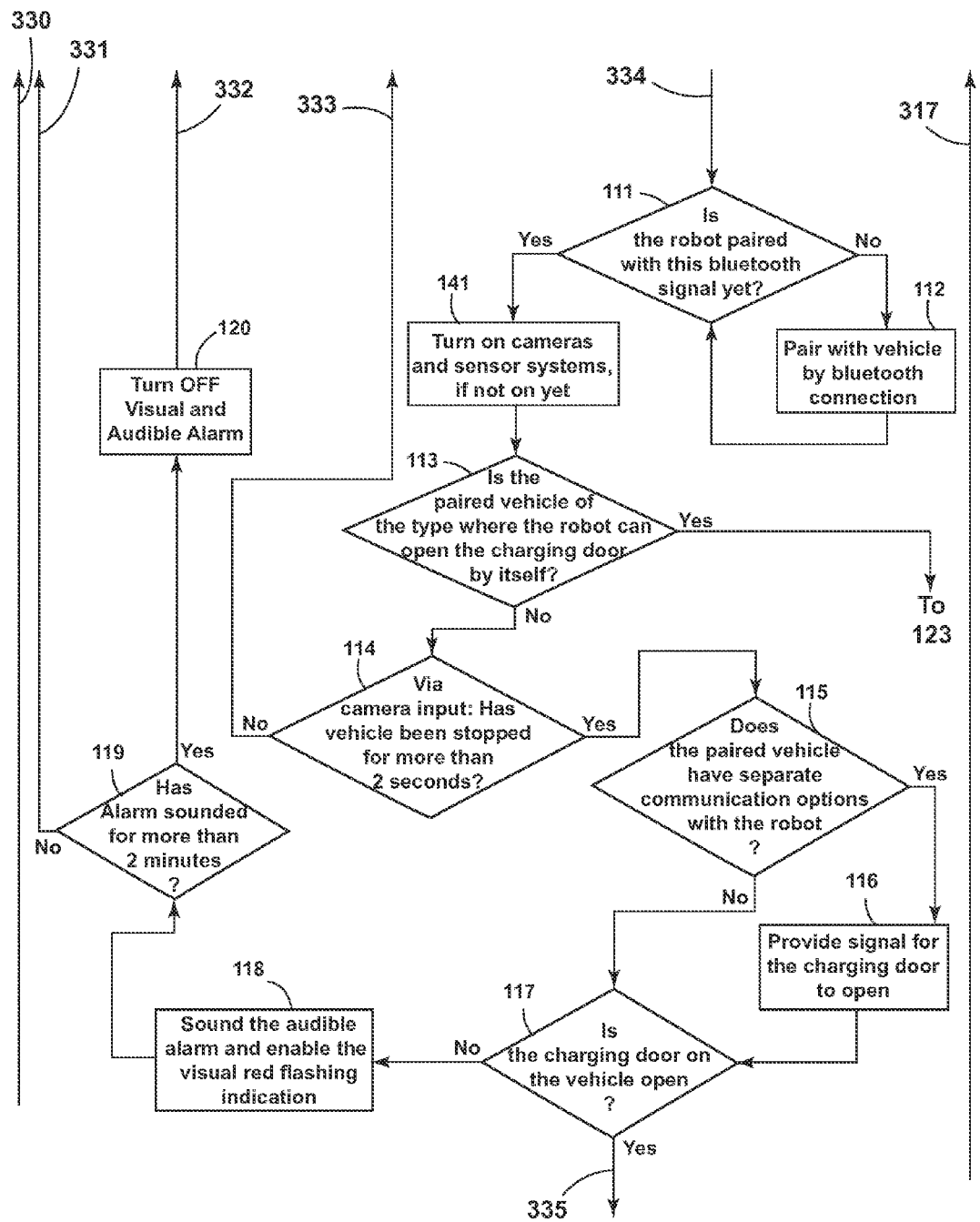
FIG. 7 is a second portion of the flow diagram illustrating operation of an illustrative embodiment of the Car Charge Robot.

As shown in FIGS. 1-5, an illustrative car charge robot 10 has a base 11 with a robotic arm divided into three arm segments 15, 16, 17, as well as three drive motors 12A, 12B, 12C, for positioning the arm segments 15, 16, 17. On the undersurface 21 of the base 11 are located two drive wheels 13A, 13B and two free swiveling wheels 14A, 14B, which enable the robot 10 to maneuver autonomously. At the end of the arm segment 17 is a charging connector 24 configured to mate with the charging connector socket 34 (FIG. 5). The connector 24 has a motorized hook latch arm 28 that pulls the charging connector 24 into the charging socket 34 on the vehicle, or helps eject the connector 24 from the charging socket 34 on the vehicle. Positioned close to the connector 24 are one or more cameras 19A, 9B, which are employed to enable the robot 10 to locate the vehicle, locate the charging door 41 on the vehicle, open the charging door 41 on the vehicle, and insert the charging connector 24 into the vehicle charging socket 34. The charging connector 24 is electrically connected through the robot arm structure to a similar charging socket 18 on the car charge robot 10. In one embodiment of the car charge robot 10, there is a separate power lead for powering the robot 10 itself. In other embodiments, there may be a built in battery pack to power the robot 10 or the robot 10 may charge from an OEM vehicle charging unit.

FIGS. 6-9 illustrate operation of the robot 10 according to one embodiment. In these figures, the numerals 311, 313, 315, 313, 317, 330, 331, 332, 333, 334, and 335 designate process flow paths. Initially, at the start 100, the robot 10 waits at point 101 to be activated in response to the user pushing the "ON/OFF" button 415 in step 102. Then the process follows steps 103, 104, 106. When "SETUP" is detected in step 106, the robot 10 executes software routines 107 that enable the user to pair the robot 10 with a vehicle, select the brand and model vehicle from a list, and fix the "park" location where the robot 10 will park. Steps 108 and 109 allow the robot 10 to be turned off at any time.

According to step 110, the robot 10 always monitors for a Bluetooth signal of a vehicle to which it has previously paired. If it does not detect the Bluetooth signal, the process follows steps 105 and 106 before returning to step 110.

Once the driver closes in with the vehicle, the robot 10 detects a Bluetooth signal at step 110 and attempts to pair with the signal, steps 111, 112. In step 141, the robot 10 turns on its camera and sensor systems.

Figure 8:
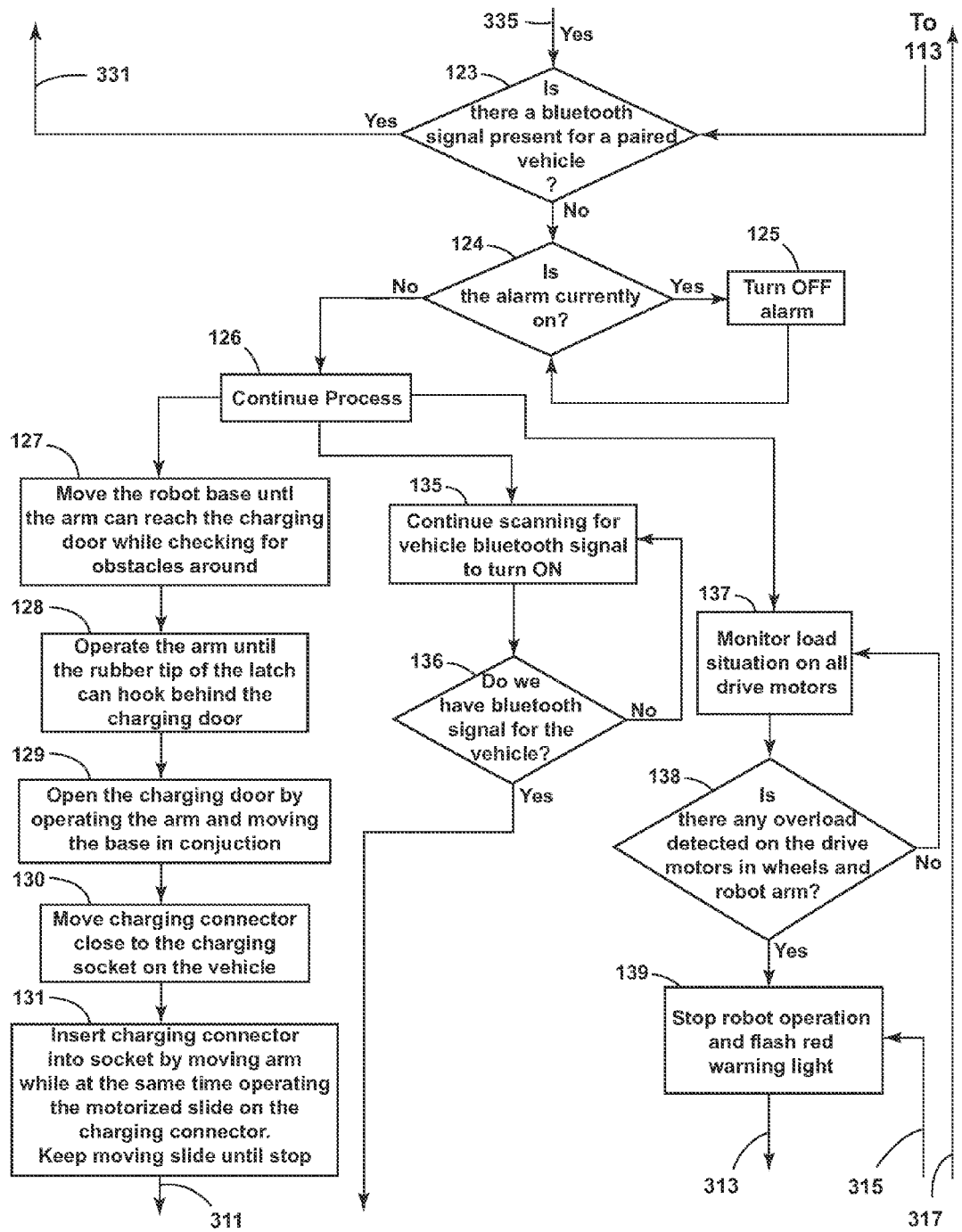
FIG. 8 is a third portion of the flow diagram illustrating operation of an illustrative embodiment of the Car Charge Robot.
Figure 9:
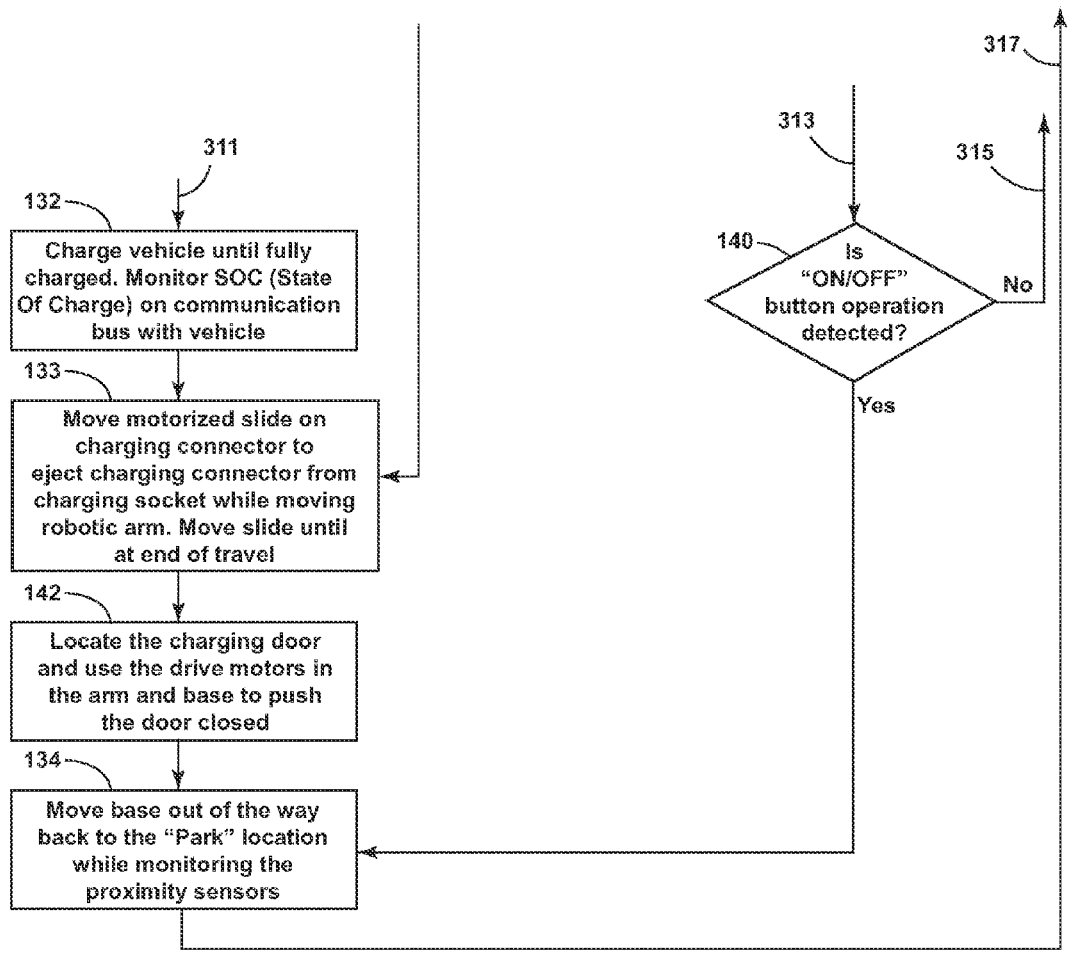
FIG. 9 is a fourth portion of the flow diagram illustrating operation of an illustrative embodiment of the Car Charge Robot.

In Step 113, the robot 10 determines if it can autonomously unlock the charging door 41. The robot 10 then waits for the vehicle to be turned off, which is indicated by the Bluetooth signal disappearing. While the Bluetooth signal stays on, the robot 10 follows the loop defined by steps, 123, 121, 122, 110, 111, 141, 113 and back to 123. As soon as the Bluetooth signal disappears, the vehicle is ready for charging. In such case, the answer to test 123 of FIG. 8 is "NO", and the robot 10 executes steps 124, 125, and 126 and then executes triple parallel processes which respectively begin at step 127, step 135, and step 137.

In the case that the vehicle does not have a door that can autonomously be unlocked by the robot 10, the robot 10 runs a triangular loop defined by steps 114, 122, 110, 111, 141, 113, 114 and waits until the vehicle has been stopped for more than 2 seconds as detected by observing the vehicle with the built in cameras 19A, 19B. When the vehicle has been stopped for more than 2 seconds, the robot 10 proceeds to step 115.

Assuming that test 115 is satisfied, at step 116, if a vehicle is so equipped, a signal from the robot 10 is sent to open or unlock the vehicle charging door 41. In step 117, using the cameras 19A, 19B, the robot 10 attempts to determine if the charging door 41 is indeed open or at least unlocked. If it is determined that the door 41 is still locked at step 117, the robot 10 proceeds to execute step 118 and sounds an audible and visual alarm 13 indicating to the driver to pop open the charging door 41, which assists to prevent the situation where a driver assumes that the vehicle battery is being charged, when in fact while the robot 10 is unable to perform this task because the charging door 41 is still locked.

Steps 119 and 120 (FIG. 7) enable the robot 10 to determine if the alarm has been on for more than two minutes. If it has not, the robot 10 goes through the loop defined by steps 121, 122, 110, 111, 141, 113, 114, 115 and back to step 117 until the door is indeed unlocked and the vehicle charging socket 24 is accessible to the robot 10.

In step 127 (FIG. 8), using the cameras 19A, 1913 and proximity sensors 10A, 10B, 10C, 10D, the robot 10 locates the charging door 41 on the vehicle. The robot 10 then uses its drive wheels 13A, 13B to autonomously move itself to a position where it can reach the charging socket 34 on the vehicle with its charging connector 24.

Figure 16:
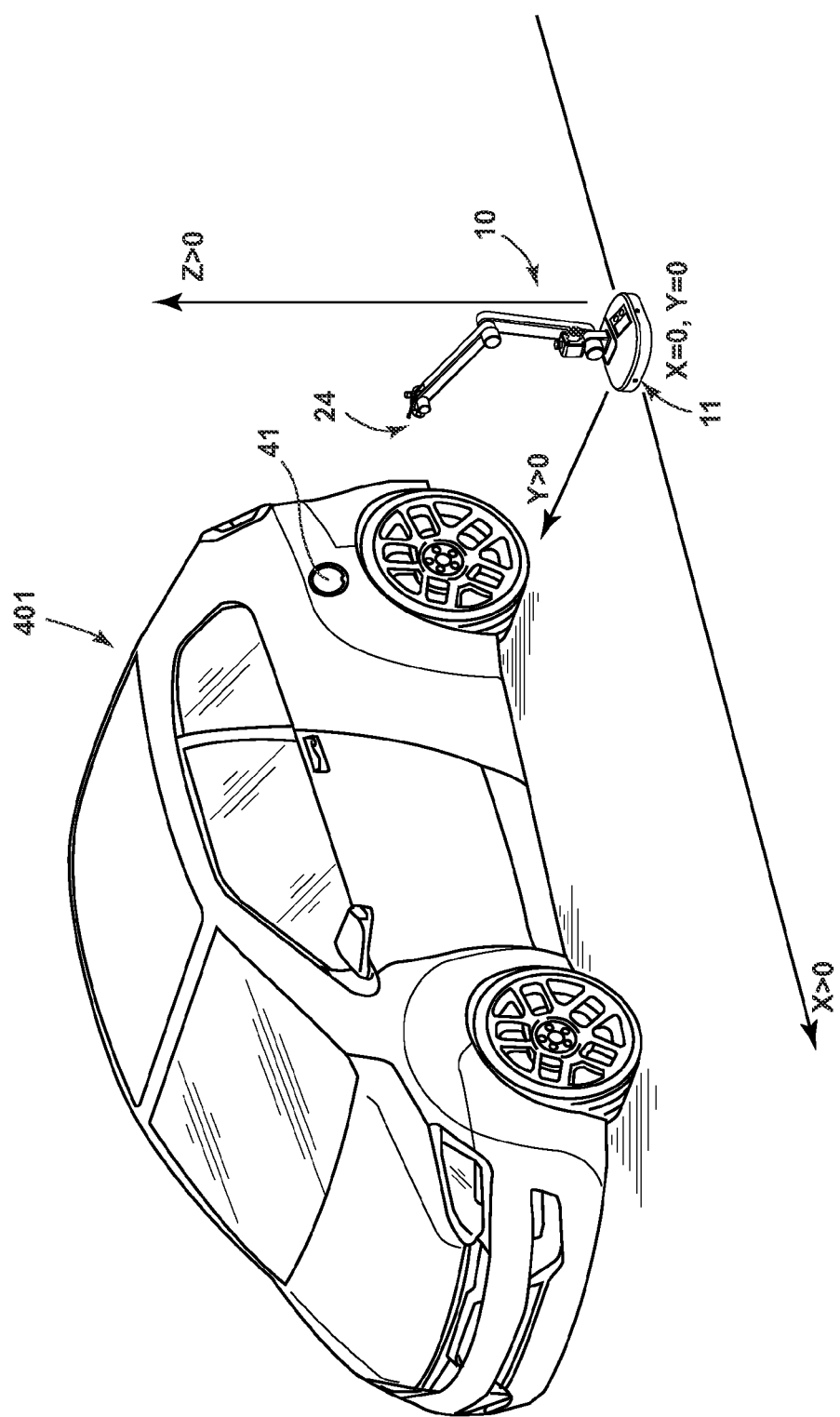
FIG. 16 is a perspective view of a vehicle and the illustrative robot useful in illustrating the operation of the robot control circuitry of FIG. 15.

Steps 137 through 140 (FIGS. 8-9) define the following procedure: in step 137, the robot 10 continues to monitor the current to all drive motors 12A, 12B, 12C, 13A, 13B, which enables the robot arm 15, 16, 17 and base 11 to stop moving if it were to touch anything. In such case, the warning light 13 turns on in step 138 and the robot 10 stops completely until the user presses the "ON/OFF" button 15, after which the robot 10 moves back to its "park" position (FIG. 16).

Another parallel process that is always running while the robot 10 is moving or charging is described in steps 135 and 136 (FIG. 8). In these steps, the robot 10 continually monitors for Bluetooth signals. If the driver wants to use the vehicle at any time during the charging operation, turning on the vehicle causes the Bluetooth to turn on, which signals the robot 10 to abort any charging related procedure, disconnect from the vehicle and move back to the "park" position.

Following step 127 (FIG. 8), are steps 128 and 129 where the robot 10 uses a rubber tip 49 on the far extension of the motorized hook latch 28 to hook behind the charging door 41 on the vehicle and by using its drive motors 13A, 13B on the base 11 and the hooked interconnection, the door 41 is opened. The camera or cameras 9A and 9B together with the output from proximity sensors 10A, 10B, 10C, 10D on the base 11 provide the software driver controller 301 (FIG. 15) with the necessary feedback.

According to steps 130 and 131 (FIG. 8), the robot 10 proceeds with opening the door 41 and maneuvering the charging connector 24 in line with the charging socket 34 in the vehicle. In one embodiment, the charging connector 24 is inserted or "plugged in" by means of the arm 17 moving while the motorized hook latch arm 28 pulls the connector 24 firmly into the charging socket 34.

At step 132 (FIG. 9), the robot 10 has enabled an OEM charging station to begin charging the battery pack in the vehicle and an indicator that the battery pack is being charged is provided by causing the warning light 13 to slowly flash.

At step 133, when charging is completed, the robot 10 detects this status. In one embodiment, this status is detected by monitoring a communication bus which is part of the standard charging interface on many embodiments of electrically powered vehicles. The robot controller 301 then causes the motorized hook latch arm 28 to push the charging connector 24 off the socket 34 in the vehicle, and to cause the slide 37 (FIG. 5) to move until it hits the end of its travel, while the arm motors 12A, 12B, 12C pull the arm 15, 16, 17 away from the vehicle.

In step 142 (FIG. 9), the cameras 9A, 9B locate the open charging door 41, and the drive motors 13A, 13B in the robot 10 base in conjunction with the drive motors 12A, 12B, 12C in the robot arm 15, 16, 17 push the charging door 41 closed.

At step 134 (FIG. 9), the robot 10 maneuvers away from the vehicle and parks itself far enough away that it will not be in the way when the driver wishes to operate the vehicle.

Figure 10:
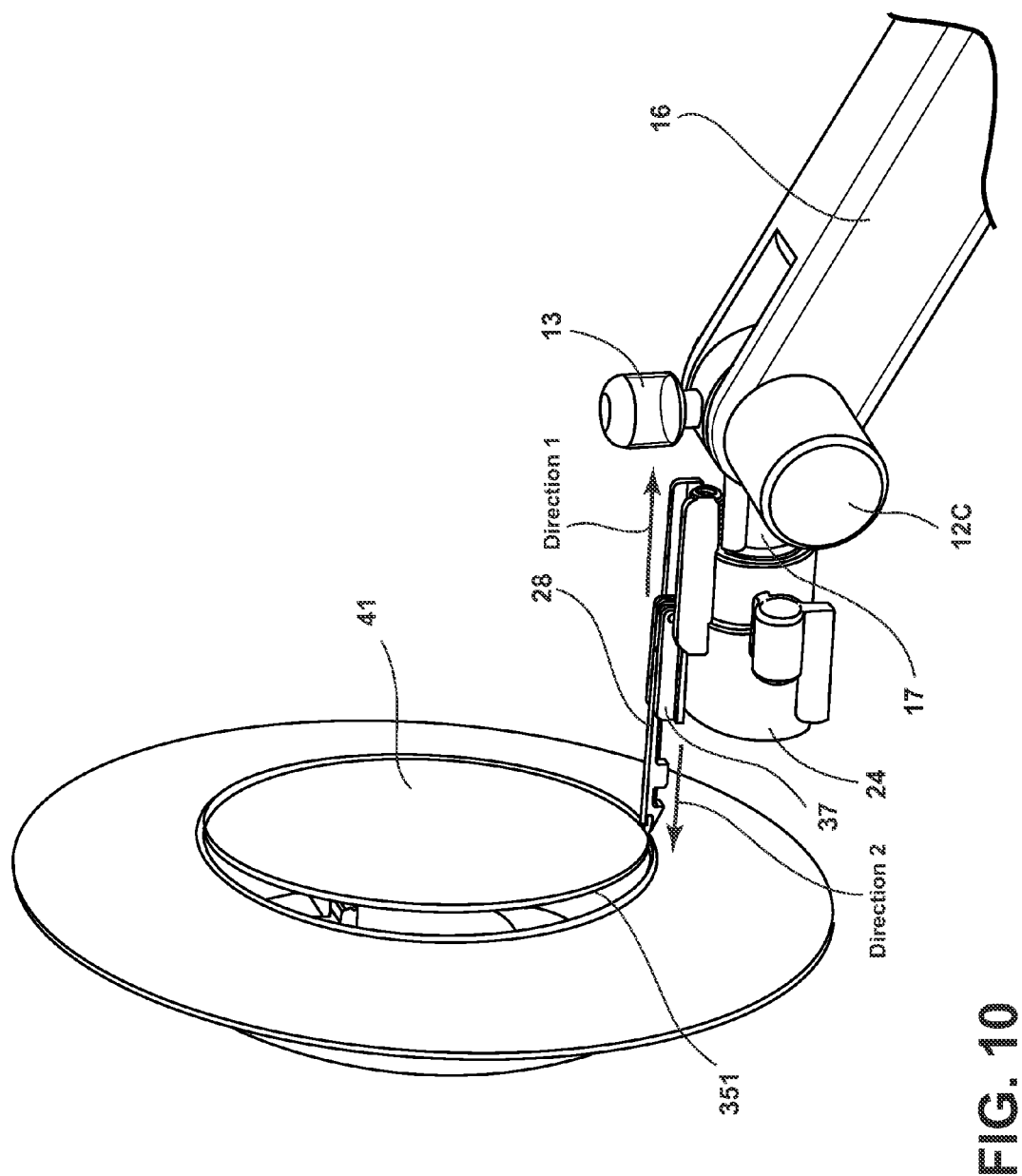
FIG. 10 is a perspective view showing the robot opening a vehicle charging cover.
Figure 11:
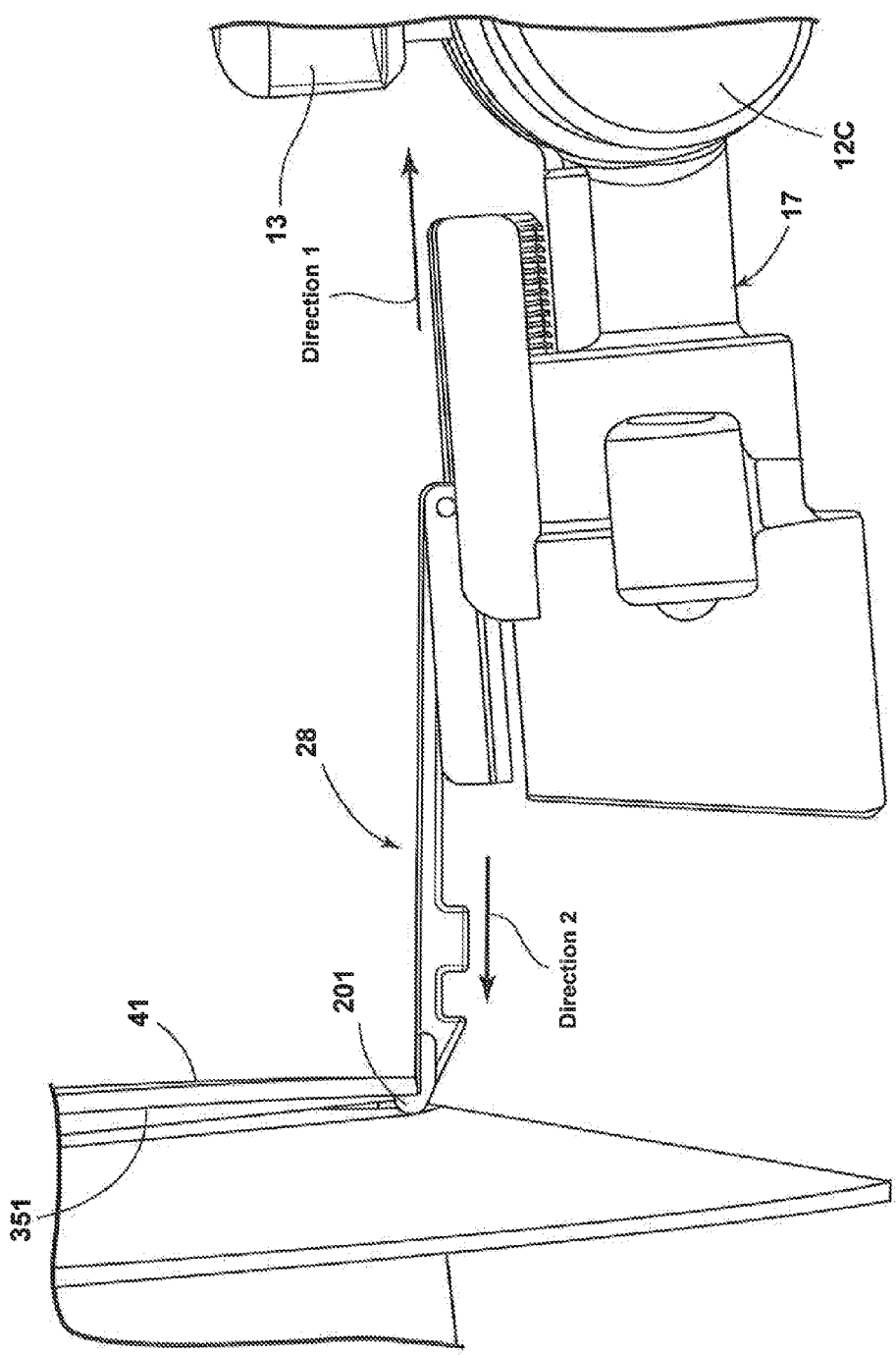
FIG. 11 is a side view showing the robot opening a vehicle charging cover.

The structure and operation of the apparatus disclosed in FIGS. 5 and 10-14 will now be described in more detail. With respect to opening charging socket door 41 on the vehicle, an upwardly pointing rubber tip 201 is provided on the motorized hook latch arm 28, and when the vehicle charging door is "popped" open by the driver, the cameras 9A, 9B guide the robot 10 arm's last segment 17 so as to cause the rubber tip 201 to catch behind the edge 351 of the charging door 41, as shown in FIGS. 10 and 11. Then, in one embodiment, corresponding movement of arm segment 17 of the robot 10 together with movement of drive wheels 13A, 13B opens the charging door 41 completely.

Figure 12:
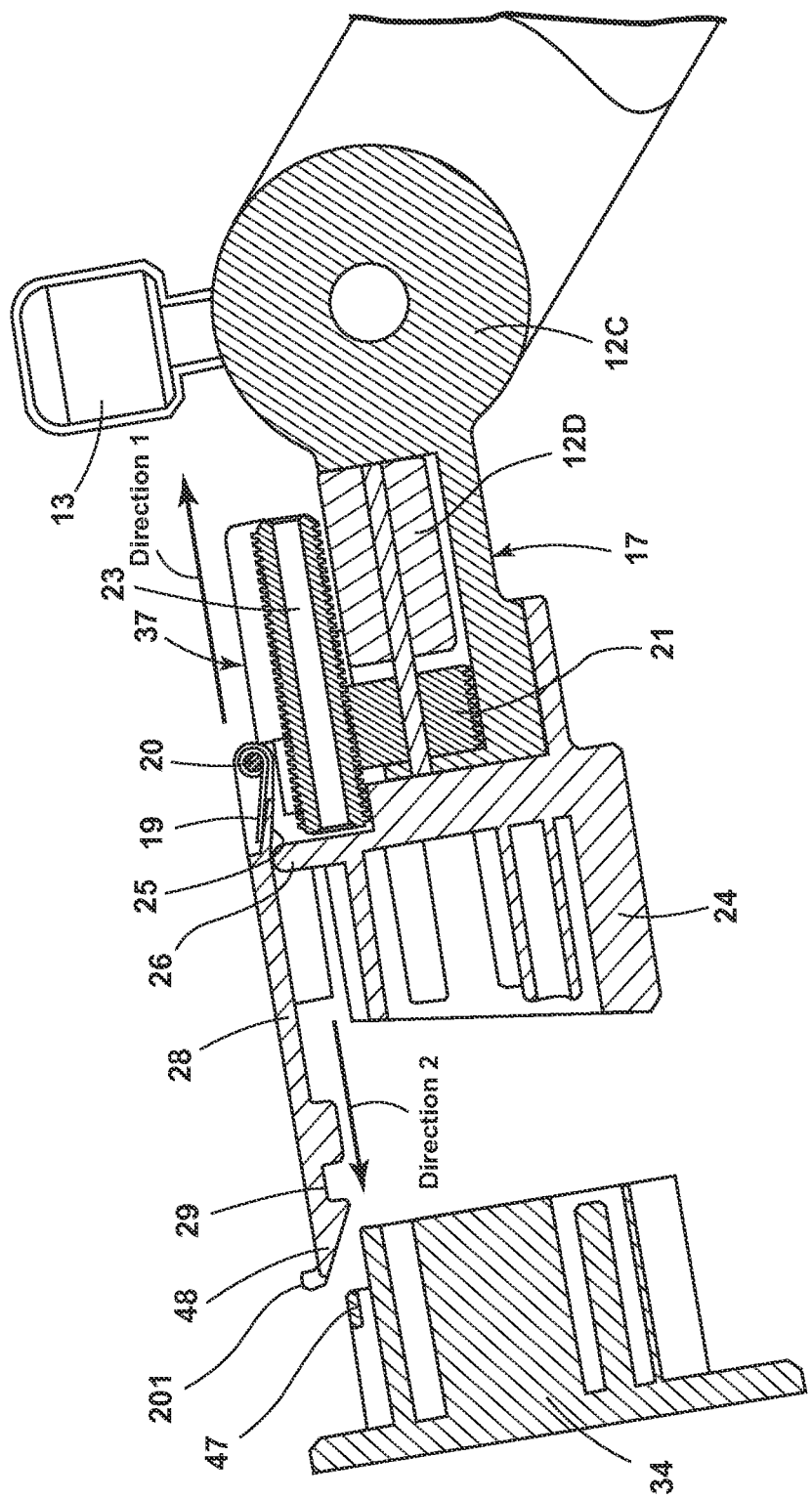
FIG. 12 is a side sectional view of an illustrative charging mechanism.
Figure 13:
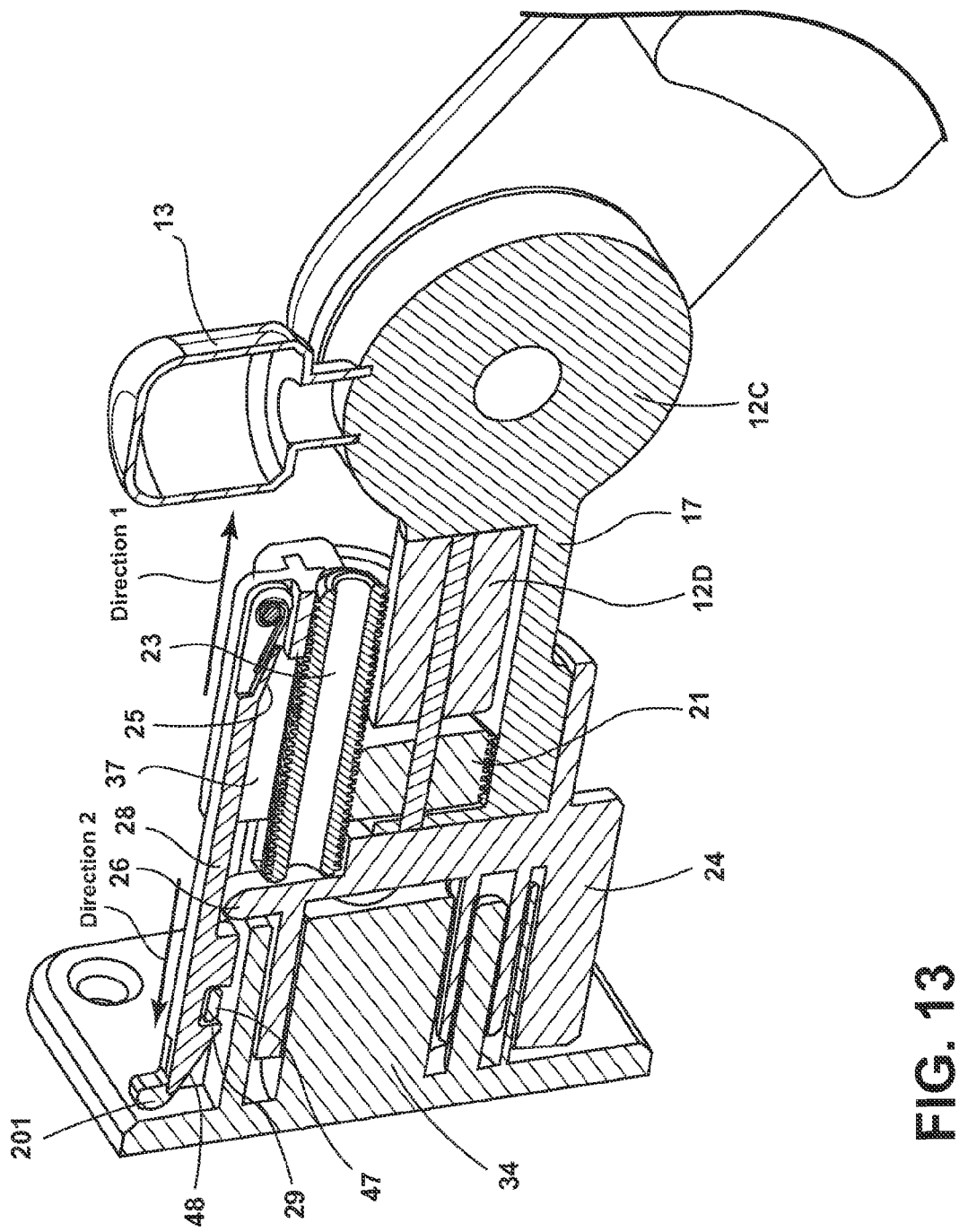
FIG. 13 is a side sectional perspective view of the illustrative charging mechanism in an installed position.

To engage and seat the charging connector 24, the robot 10 moves the arm segment 17 and the charging connector 24 closer towards the charging socket 34, such that the slide 37 is placed in the FIG. 12 position. At this point, the hook latch arm 28 can pivot around a pin 20 and is spring biased downwardly via a spring 19. As the robot arm segment 17 moves forward, a ramp 48 located at the end of the hook latch arm 28 rides up on a catch 47 until the rectangularly shaped hook 29 reaches a position in which the catch 47 is positioned within the hook 29, as shown in FIG. 13. Now, the motor 12D engages and, via worm drive gear 23, and intermediate gear 21, pulls the slide 37 in Direction 1, which in turn drives the charging connector 24 firmly into the charging socket 34, as shown in FIG. 5.

Figure 14:
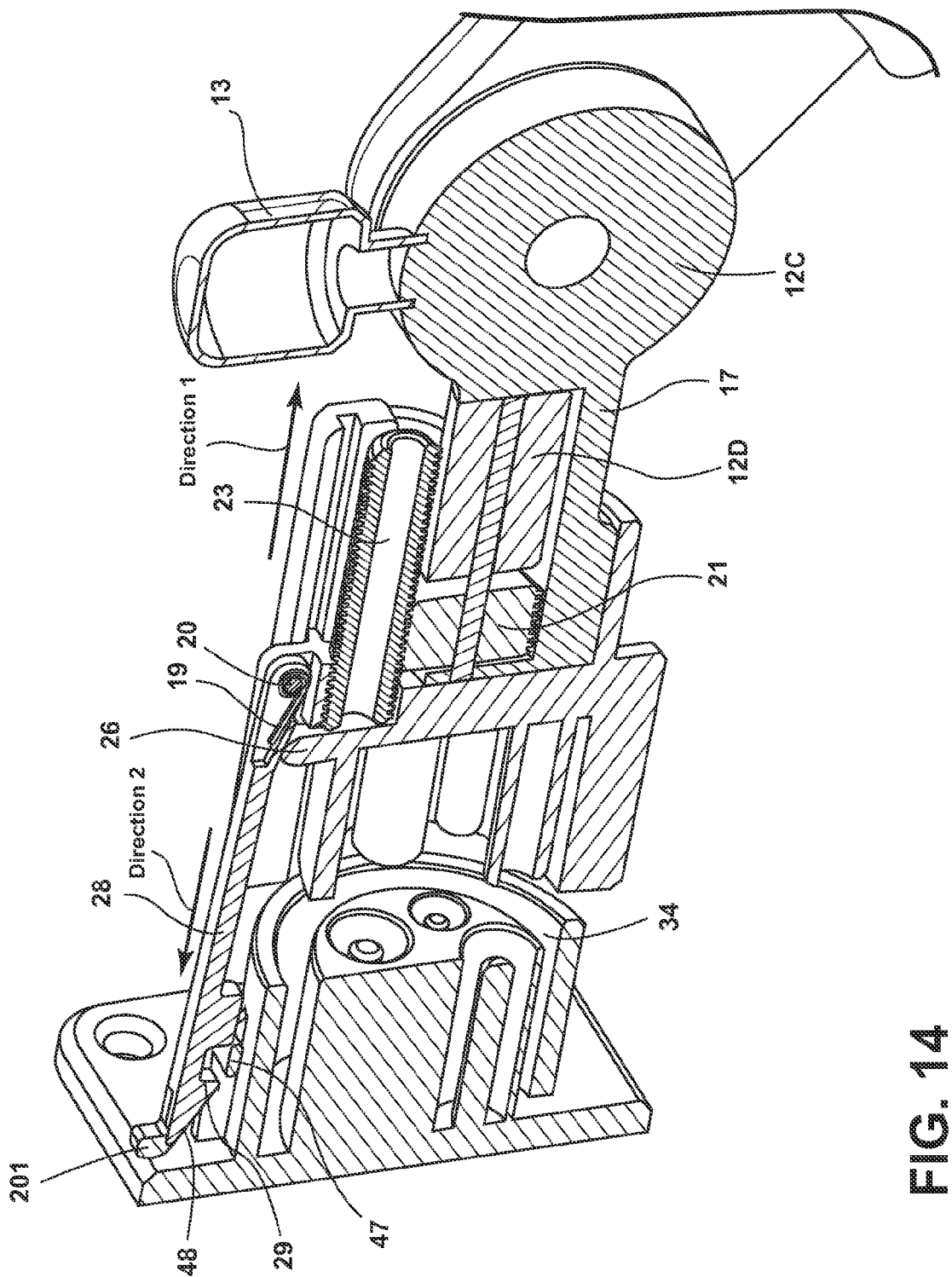
FIG. 14 is a side perspective view of the charging mechanism being removed from the vehicle charging receptacle.

To unseat and release the charging connector 24, the motor 12D engages in the opposite direction, and via drive gear 23 and intermediate gear 21, the motor 12D moves the slide 37 in Direction 2, thereby unseating the charging connector 24 and forcing it away from the charging socket 34. When the charging connector 24 is in the position shown in FIG. 5, the hook 29 is still interlocked with the catch 47. At this point, the slide 37 continues in Direction 2, which causes a ramp 25 (FIG. 12) to ride onto a stop 26, forcing the hook 29 up far enough that it clears the catch 47, as shown in FIG. 14. In one embodiment, the robot arms 15, 16, 17 now move the charging connector 24 completely away from the vehicle. To close the charging door 41, the robot 10 uses its cameras 9A, 9B to guide the robot arm segment 17 so as to use the extended rubber tip 201 to contact the vehicle charging door 41 and then push it closed.

Figure 15:
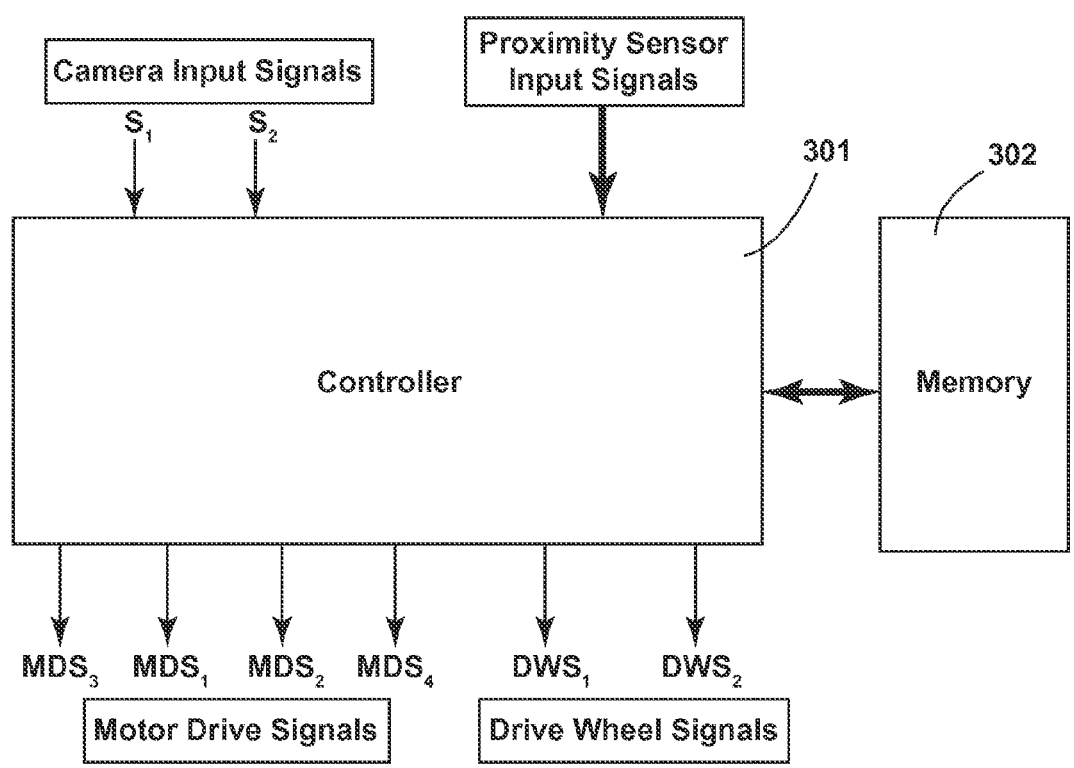
FIG. 15 is a block diagram of robot control circuitry.

An illustrative embodiment of a control system for maneuvering the robot 10 and its arms 15, 16, 17 and charging connector manipulation mechanism to accomplish the functions described herein is shown in FIG. 15. The embodiment of FIG. 15 employs a controller 301, which may comprise a microprocessor or other computing device capable of executing programmed instructions to process input signals and provide output control signals as required to control the robot 10. As shown in FIG. 15, the controller 301 is configured to receive camera input signals, e.g. S1, S2 and proximity sensor input signals and to provide output control signals e.g. MDS1, S2, S3, and S4 and drive motion control signals $DWS_1$ and $DWS_2$ to the drive motors of the robot 10. In one embodiment, the controller 301 of FIG. 15 further includes non-transitory executable instructions stored in a memory 302. The executable instructions serve to cause generation of suitable control signals to cause the robot 10 to perform the movements and functions described herein in more detail below.

The mobile camera-space manipulation techniques employed to maneuver the robot 10 in the manner described below are known to those skilled in the art, for example, as illustrated by U.S. Pat. No. 6,194,860 entitled "Mobile Camera-Space Manipulation" filed Nov. 9, 1999, and incorporated by reference in its entirety herein. To further illustrate the functionality employed according to an illustrative embodiment, referencing FIG. 16, the robot 10 charging process starts with the robot 10 in its "park" position, which is somewhere along the Y=0 edge of an X/Y/Z space with X being the axis parallel to the centerline of the vehicle 401 that is to be charged, and the Y axis being the perpendicular axis from the robot 10 to the vehicle 401 and only allowing positive values, and the Z axis being the axis from the ground up, with Z=0 being at ground level with only positive values allowed. The following functional description uses decimal feet in three decimals as the unit size, noting that any dimensional unit can be used for this purpose.

As shown in FIG. 16, the park position is at X=0.000, Y=0.000 with the charging connector 24 located at some positive value of Z. From the robot 10 "perspective, with the base 11 of the robot 10 and proximity sensor 10C facing towards Y>0.000, we know that X>0 to the LEFT of the robot's "park" position, and X<0 to the RIGHT of the "park" position. The direction that the charging connector 24 is facing is quantified by using two angles, one being "A" and one being "B". Angle "A" is the angle (in decimal degrees) that the robot base 11 is facing and is measured on the Z=0 plane with A=0.0 being with proximity sensor 10C facing along the Y=0 axis in the X>0 direction. Angle "B" is the angle (in decimal degrees) that the charging connector 24 and video cameras 9A, 9B are facing from a value of 0° being straight down (along axis Z) and 180° being straight up. The "park" position indicates C has an angle A=90.0 and angle B=90.0.

To begin, the robot 10 is in the "ON" mode, but is also in standby mode, which leaves only the Bluetooth receiver of the vehicle 401 being monitored. The video cameras 9A, 9B, as well as the proximity sensors 10A, 10B, 10C, 10D are off. Previously, by performing a specific SETUP procedure, the owner has instructed the parked robot 10 vehicle brand/model/year it will be charging, and has paired the Bluetooth receiver of the robot 10 with the vehicle 401. As soon as a vehicle 401 comes within range of the robot's Bluetooth receiver, the robot 10 comes out of "Standby" mode and turns on its set of proximity sensors 10A, 10B, 10C, 10D, and both of its video cameras 9A, 9B. The robot 10 can now decide if the vehicle 401 is indeed a vehicle that the robot 10 can perform the task of autonomously opening the vehicle charging door 41. If that is the case, the process continues.

At this point, assuming that the robot 10 has determined that the vehicle 401 needs the driver to operate the "unlatch" function on the charging door 41, the robot 10 will continue to monitor the outputs of video cameras 9A, 9B until it is clear that the vehicle 401 has come to a complete stop, which is indicated by the vehicle position in the camera 9A vs. camera 9B images not changing for at least 2 seconds. At this point, the robot 10 looks for the charging door 41 location on the vehicle 401, which is within a certain distance of the robot 10 in the X direction (either positive or negative) and a certain distance in the Y direction.

By comparing the video images from video cameras 9A, 9B to stored images of a vehicle similar to paired vehicle 401, the robot 10 determines if the vehicle 401 is parked close enough to the robot's "park" position, ensuring that the robot 10 will be able to reach the vehicle charging door 41. If the robot 10 controller 301 determines that the distance to the vehicle charging door 41 as indicated by the video images from video cameras 9A, 9B is too large, it will enable a visual and audible alarm, which tells the driver to park the vehicle 401 closer to the robot 10 "park" location.

Next, the robot 10 compares the current video images from video cameras 9A, 9B to stored images of a similar vehicle and determines if the charging door 41 is unlatched ("popped open"). If it is determined that the charging door 41 is NOT unlatched, the robot 10 emits a visual and audible alarm that will remind the driver to unlatch the vehicle charging door 41. The robot 10 now waits for the Bluetooth signal from the vehicle 401 that it previously paired with to disappear, indicating that the vehicle 401 has been turned off, allowing the robot 10 to proceed with its connecting and charging procedures.

As soon as the Bluetooth signal from the vehicle 401 has disappeared, the robot 10 uses the video output of video cameras 9A, 9B to determine the exact location of the vehicle charging door 41 by approximating the X and Y coordinates by comparing the video output to stored images of the same type of vehicle at various locations, distances and angles from the robot 10. For example, assume that the vehicle charging door 41 is located at X=2.500 and Y=3.500 from the robot 10 starting position. Further assume that, the charging socket height is known to the robot 10 from the data on the vehicle model, and is Z=3.000. The robot 10 can now determine what the best path is to lineup the robot base 11 with the vehicle 401 and place robot base 11 close enough that the robot arm segment 17 will be able to reach the vehicle charging door 41. In this case, based on the drive system that the robot 10 has, the robot 10 will, for instance, turn to A=135.0°, move its base 11 along this line until X=2.500, Y=2.500, and then turn to A=90.0° again and then stop. The robot 10 maintains a memory log for all movements in each direction until it is back in the "park" position and therefore can determine with reasonable accuracy its position while it is maneuvering between the "park" position and the vehicle 401 at any time.

The robot 10 now engages its wheel drive motors 13A, 13B and initially runs one wheel drive motor 13B several more RPM than the other wheel drive motor 13A, which makes the robot base 11 turn from A=90.0° to around A=135.0°. Then the RPMs on both wheel drive motors 13A, 1313 are equalized, which causes the robot base 11 to move toward the vehicle 401 at an angle of 45 degrees. When close to the X=2.500, Y=2.500 location, the robot 10 increases the RPM on wheel drive motor 13A so as to cause the robot base 11 to turn facing the vehicle charging door 41 and stop when the charging connector 24 is lined up with the charging door 41.

During movements of the base 11, the robot 10 monitors its proximity sensors 10A, 10B, 10C, 10D to prevent bumping into obstacles. As soon an obstacle is sensed that is getting too close, the robot 10 will stop, and determine the best path from the current location, while initially avoiding moving into the direction that triggered the proximity sensor alarm. If the robot 10 cannot determine a way to maneuver without triggering any of the proximity sensors 10A, 10B, 10C, or 10D, it will stop operating and enable a visual alarm, which, in one embodiment, requires the user to push the "ON/OFF" button 15, which will cause the robot 10 to return to its "park" position.

Once stopped and lined up with the vehicle charging door 41, the robot 10 engages the drive motors 12A, 12B to raise rubber tip 201 on the hook latch arm 28 to the level where the rubber tip 201 can hook behind the vehicle charging door 41. While the drive motors 12A, 12B are engaged, the robot 10 uses drive motor 12C to maintain angle B at 90.0° (horizontal) or any angle that may be suitable for the vehicle 401. Next, the robot 10 engages drive motors 12A, 12B to pull open the vehicle charging door 41. If needed for this specific vehicle, the robot 10 can engage wheel drive motor 13A in one direction and wheel drive motor 13B in an opposite direction to rotate the base 11, which changes angle A, which can assist in fully opening vehicle charging door 41.

Next, the robot 10 uses its video cameras 9A, 9B to determine the current position of the charging connector 24 as compared to the now accessible charging socket 34 on the vehicle. Wheel drive motors 13A, 13B are activated to align the charging connector 24 with the vehicle charging socket 34. The robot 10 also determines the required angle to use for angle B to enable insertion of the charging connector 24 into the vehicle charging socket 34, and activates the drive motor 12C to get to this angle, while utilizing the drive motors 12A, 2B to completely line up the charging connector 24 with the charging socket 34.

The robot 10 now engages motor 12D to move the Motorized Latch Slide 37 in Direction 1 until it reaches the position of FIG. 12, with the Latch Hook arm 28 top surface parallel to the centerline of the connector 24. The robot 10 uses video images from video cameras 9A, 9B to ensure that the latch hook 29 is lined up to mate with the catch 47, and that the centerline through connector 24 is collinear with the centerline through socket 34.

The robot 10 now engages the drive motors 12A, 12B and 12C to bring the connector 24 closer to the socket 34, while keeping the two aligned. The Ramp 48 will now force the end of the Latch Hook arm 28 up until the hook 29 engages catch 47 as in FIG. 5.

At this time, the robot 10 uses the motor 12D to move the slide 37 in Direction 1 until the slide 37 pulls the charging connector 24 firmly onto the charging socket 34. The motor 12D stops when the slide 37 is stopped by the stop 26, which means that the charging connector 24 is fully connected with the charging socket 34, as can be seen in FIG. 13. The robot 10 now picks up communication with the vehicle battery management system and battery charging begins and continues until the vehicle battery is fully charged.

Parallel to the process described between [0052] and [0059]above, there is a parallel process that monitors for the Bluetooth signal of the vehicle 401. If the signal appears, it is an indication that the driver wants to use the vehicle 401, and the robot 10 instantly initiate charge abort and connector removal procedures and returns back to its "park" position to enable the driver to leave with the vehicle 401.

Also parallel to the process described between [0052] and [0059] is a process that monitors the load on wheel drive motors 13A, 13B, and the drive motors 12A, 12B, 12C, and the latch motor 12D. If the load sensing indicates a larger than normal load on any motor, it is an indication that something is blocking movement. In such cases, the robot 10 turns on a flashing indicator light and stops operating. At this point, pushing "ON/OFF" on the control panel turns on the robot 10 again and causes it to return to its "park" position.

In one embodiment, when the robot 10 detects that a battery pack is fully charged by reading the data on the communication bus, it will initiate a charging connector ejection procedure. The motor 12D engages and through intermediate gear 21 moves the slide 37 in Direction 2, causing the hook latch arm 28 to push against the catch 47, resulting in pushing the charging connector 24 away from the charging socket 34 on the vehicle. The last part of the travel of the slide 37 causes ramp 25 to run onto stop 26, which causes the hook latch arm 28 to raise up sufficiently to clear the catch 47.

While the motor 12D is running, the robot 10 also engages drive motors 12C, 12B, 12A to enable free movement away from the charging socket 34. When the charging connector 24 is clear, the robot 10 engages motors 12A, 2B, 2C again to pull charging connector 24 away from the vehicle, while keeping the video cameras 9A, 9B pointing at the vehicle 401.

At this point, the robot 10 compares video images from the video cameras 9A, 9B to stored images of the vehicle type to locate the position of the robot 10 compared to the vehicle 401 and operates the drive motors 13A, 13B in opposite directions to turn the base 11 while extending rubber tip 201 using drive motors 12A, 12B, 12C to hook the vehicle charging door 41. The robot 10 compares this current situation to stored images of the vehicle door 41 to ensure that the robot 10 can now push the door 41 closed. By now operating the drive motors 12A, 12B, 12C to push the door 41 while simultaneously operating wheel drive motors 13A, 13B in opposite directions to each other, the robot 10 swings the charging door 41 toward the closed position. Now the robot 10 again compares the current situation as seen by video cameras 9A, 9B, compares this to stored images, and determines what arm movement will be required to enable the rubber tip 201 to push the charging door 41 into a latched position. Then, the robot 10 executes the determined maneuver of the arm by engaging drive motors 12A, 12B, 12C to push the charging door 41 into its latched position.

The robot 10 next operates drive motors 12A, 12B, 12C, such that the charging connector 24 with attached video cameras 9A, 9B stops at Z=3.000, with angle A being 90.0°, and angle B being 90.0°. At this point the robot 10 compares video images from video cameras 9A, 9B to stored images of the vehicle type to locate its position compared to the vehicle 401. The robot 10 then uses the data stored in memory defining the initial distance and route taken from the park position to the vehicle charging door 41 and determines the route the robot base 11 needs to take to return to the "park" location, which will be the reverse of the initial route taken to get from the "park" position to the vehicle 401. The robot 10 then engages its base drive motors 13A, 13B and runs drive motor 13A several more RPMs than drive motor 13B, which causes the robot base 11 to turn from A=90.0° to around A=135.0°. The robot controller 301 then equalizes the RPM on both motors 13A, 13B, which causes the robot 10 to move away from the vehicle at an angle of 45 degrees. When close to the X=0.000, Y=0.000 location, the robot controller 301 increases the RPM on drive motor 13B so as to cause the base 11 to turn facing the vehicle charging door 41 again and stops when the charging connector 24 is lined up with the charging door 34. The ultimate position for the robot 10 is X=0.000, Y=0.000 with the charging connector 24 and video cameras 9A, 9B at Z=3.000 and Angle A=90.0° and Angle B=90.0°.

Those skilled in the art will appreciate that various adaptations and modifications of the just described illustrative embodiments can be configured without departing from the scope and spirit of the invention, and can be configured to charge various electrically powered vehicles such as, for example electrically powered cars, buses, trucks, motorcycles, and golf carts. Therefore, it is to be understood that, within the scope of the appended claims, the invention may be practiced other than as specifically described herein.

What is claimed is:

1. Apparatus for connecting an electrical charging connector to an electrical charging socket of a vehicle comprising:
   an arm pivotally mounted to a robot arm segment so as to pivot with respect to the robot arm segment about a horizontal axis;
   a slide component having the electrical charging connector attached thereto;
   a motor mounted on said arm and coupled through a drive mechanism to drive said slide component and electrical charging connector linearly toward and away from said vehicle;
   a latch arm having a back end pivotally mounted to said slide component, the latch arm having a tip projecting vertically from a top surface of a front end thereof, said latch arm being spring biased downwardly;
   a first ramp located on an underside of said elongated latch arm and angled downwardly from said tip;
   an indented hook formed on the underside of said latch arm and positioned adjacent a lower end of said first ramp, the indented hook being configured to come into an interlocking relationship with a catch positioned on the vehicle charging socket, the apparatus being further configured such that, after said indented hook interlocks with said catch, said motor and drive mechanism is operable to drive the slide component away from the vehicle, thereby applying a force which draws the electrical charging connector towards the electrical charging socket and into electrical connection therewith;
   a stop positioned on a top edge of said charging socket;
   a second ramp located on the underside of the front end of said elongated latch arm;
   the stop on the top edge of the charging socket and the second ramp being configured such when the slide component is moved a selected distance away from the vehicle by the motor and drive mechanism, the second ramp runs onto the stop causing the latch arm to pivot upwardly, thereby allowing the indented hook to disengage from the catch on the electrical charging socket to thereby enable the electrical charging connector to be pulled away from the vehicle.

2. A vehicle charging apparatus comprising:
   a robot base having a plurality of motorized drive wheels located on an underside thereof, the motorized drive wheels being actuable to cause the robot base to move from a first position spaced apart from a vertical side of the vehicle to a second position nearer a vertical side of the vehicle;
   a robotic arm comprising a plurality of arm segments mounted to the robot base, each arm segment having a respective drive motor operable to position the respective arm segment wherein said plurality of arm segments comprise a first arm segment mounted at a lower end to a top surface of said robot base so as to pivot about a horizontal axis, a second arm segment mounted at a lower end to an upper end of said first arm segment so as to pivot about a horizontal axis, and a third arm segment mounted at a first end thereof to an upper end of said second arm segment so as to pivot about a horizontal axis;
   a first electrical charging connector configured to mate with a vehicle electrical charging socket, the electrical charging connector being attached to a slide component;
   a motor mounted on said third arm segment and coupled through a drive mechanism to drive the slide component and attached electrical charging connector linearly toward and away from said vehicle; and
   a latch arm having a back end pivotally mounted to said slide component, the latch arm having an indented hook formed on an underside thereof, the apparatus being configured such that the indented hook comes into an interlocking relationship with a catch positioned on the vehicle prior to establishment of electrical connection between said electrical charging connector and electrical charging socket and such that, after said indented hook interlocks with said catch, said motor and drive mechanism is operable to drive the slide component away from the vehicle, thereby applying a force which draws the electrical charging connector towards the electrical charging socket and into electrical connection therewith.

3. The vehicle charging apparatus of claim 2 further configured to open a charging door of said vehicle.

4. The vehicle charging apparatus of claim 3 further comprising a plurality of video cameras for generating control signals for enabling the apparatus to: locate a vehicle, locate the charging door, open the charging door, and cause the electrical charging connector to mate with the electrical charging socket.

5. The vehicle charging apparatus of claim 4 further comprising a plurality of proximity sensors configured to generate signals to assist in positioning the apparatus.

6. The vehicle charging apparatus of claim 5 wherein said electrical charging connector is alignable with respect to said vehicle by actuation of one or more of said drive motors.

7. The vehicle charging apparatus of claim 6 further configured to monitor a Bluetooth signal from the vehicle to determine when to begin a charging procedure.

8. The vehicle charging apparatus of claim 7 further configured to employ said plurality of video cameras to determine the location of the charging door of the vehicle.

9. The vehicle charging apparatus of claim 8 further configured to determine a best path to the vehicle and to actuate said plurality of motorized drive wheels in said base so as to cause the robot base to follow said path.

10. The vehicle charging apparatus of claim 9 further configured to engage a plurality of drive motors to raise a rubber tip on the motorized latch arm to a level where the rubber tip hooks behind a charging door and to further use one of said drive motors to maintain a selected angle between the electrical charging connector and the vehicle, whereafter the plurality of drive motors are activated to open the charging door.

11. The vehicle charging apparatus of claim 10 further configured to employ said plurality of video cameras to determine a current position of the electrical charging connector with respect to the vehicle and to thereafter activate the plurality of motorized drive wheels to align the electrical charging connector with the electrical charging socket.

12. The vehicle charging apparatus of claim 2 wherein said catch is located on the electrical charging socket.

13. The vehicle charging apparatus of claim 2 further comprising:
   a stop positioned on a top edge of said electrical charging socket;
   a ramp located on the underside of the front end of said latch arm;

the stop on the top edge of the electrical charging socket and the second ramp being configured such when the slide component is moved a selected distance away from the vehicle by the motor and drive mechanism, the ramp runs onto the stop causing the latch arm to pivot upwardly, thereby allowing the indented hook to disengage from the catch to thereby enable the electrical charging connector to be pulled away from the vehicle.

14. The vehicle charging apparatus of claim 12 further comprising:
a stop positioned on a top edge of said electrical charging socket;
a ramp located on the underside of the front end of said latch arm;
the stop on the top edge of the electrical charging socket and the second ramp being configured such when the slide component is moved a selected distance away from the vehicle by the motor and drive mechanism, the ramp runs onto the stop causing the latch arm to pivot upwardly, thereby allowing the indented hook to disengage from the catch to thereby enable the electrical charging connector to be pulled away from the vehicle.

15. The vehicle charging apparatus of claim 2 further comprising:
a plurality of sensors and a plurality of video cameras configured to provide a plurality of signals to enable the apparatus to locate the electrical charging socket and to plug the electrical charging connector into the electrical charging socket;
a controller responsive to the plurality of signals to cause the apparatus to automatically perform the tasks of locating the vehicle, controlling said motorized drive wheels so as to cause the apparatus to move from a first position spaced apart from a vertical side of the vehicle to a second position nearer the vertical side of the vehicle, plugging in the electrical charging connector, disconnecting the electrical charging connector, and controlling said motorized drive wheels to cause the apparatus to move away from the vehicle.

16. The apparatus of claim 3 wherein said latch arm has a tip projecting vertically from a top surface thereof and is further configured to employ first and second drive motors to raise said tip to a level required to hook behind a charging door while employing a third drive motor to maintain said latch arm at an angle selected to hook said tip behind said charging door and to thereafter employ said first and second drive motors in pulling open the charging door.

17. The apparatus of claim 3 further configured to determine a best path for lining up said robot base with said vehicle using an X-Y position of the charging door and a charging socket height so as to place said first arm segment at a selected distance from said charging door.

18. The apparatus of claim 2 further configured to activate first and second of said motorized drive wheels to align the electrical charging connector with the electrical charging socket, to determine the required angle to use to enable insertion of the electrical charging connector into the electrical charging socket, to activate a first of said drive motors to meet said angle, while utilizing a second and a third of said the drive motors to line up the electrical charging connector with the electrical charging socket so as to ensure that a centerline through the electrical charging connector is collinear with a centerline through the electrical charging socket.

19. The apparatus of claim 2 further configured to initiate a charging connector ejection procedure wherein the motor mounted on said first arm and the drive mechanism move the slide component toward the vehicle causing the indented hook to push against the catch, resulting in pushing the electrical charging connector away from the electrical charging socket, and thereafter causing a ramp to run onto a stop to thereby raise the indented hook up sufficiently to clear the catch.

20. A vehicle charging robot comprising:
a base having a plurality of motorized drive wheels located on an underside thereof, said motorized drive wheels being actuable to move the base across a surface;
a robotic arm comprising a plurality of arm segments mounted to the base, a first arm segment being mounted at a lower end to a top surface of said base so as to pivot about a horizontal axis, a second arm segment being mounted at a lower end to an upper end of said first arm segment so as to pivot about a horizontal axis, and a third arm segment being mounted at a first end thereof to an upper end of said second arm segment so as to pivot about a horizontal axis;
an electrical charging connector configured to plug into an electrical charging socket located behind a charging socket door of the vehicle;
a slide component attached to the charging connector;
a motor mounted on said third arm segment and coupled through a drive mechanism, the motor and drive mechanism being configured to drive said slide component and electrical charging connector linearly toward and away from said vehicle;
an elongated latch arm having a back end pivotally mounted to said slide component, the elongated latch arm having a tip projecting vertically from a top surface of a front end thereof;
a first ramp on the underside of said elongated latch arm angled downwardly from said tip;
an indented hook formed on the underside of said latch arm and positioned adjacent a lower end of said first ramp, the indented hook being configured to come into an interlocking relationship with a catch positioned on the vehicle charging socket as the motor and drive mechanism drive the slide component towards the vehicle;
said latch arm being spring biased downwardly;
a stop positioned on a top edge of said electrical charging connector;
a second ramp located on the underside of the front end of said elongated latch arm;
the robot being configured to employ first and second robot arm drive motors to raise said tip to a level required to hook behind the charging door while employing a third robot arm drive motor to maintain said elongated latch arm at an angle selected to hook said tip behind said charging door, and to thereafter employ said first and second drive motors in pulling open the charging door;
the robot further being configured such that after said indented hook interlocks with said catch, said motor and drive mechanism are operable to drive the slide component away from the vehicle, thereby causing said hook to apply a force to the catch which draws the electrical charging connector towards the electrical charging socket and into electrical connection therewith;
the stop on the top edge of the electrical charging socket and the second ramp being configured such when the slide component is moved a selected distance away from the vehicle by the motor and drive mechanism, the second ramp runs onto the stop causing the latch arm to pivot upwardly, thereby allowing the indented hook to disengage from the catch on the electrical charging socket to thereby enable the electrical charging connector to be pulled away from the vehicle;

a plurality of sensors and a plurality of video cameras configured to provide a plurality of control signals; and a controller responsive to the plurality of control signals to automatically cause performance of the tasks of (a) locating the vehicle, (b) controlling said motorized wheels so as to cause the apparatus to move from a first position from a vertical side of the vehicle to a second position nearer the vertical side of the vehicle, (c) opening the vehicle's charging socket door and plugging in the electrical charging connector, (d) disconnecting the electrical charging connector, (e) closing the charging socket door, and (f) controlling said motorized wheels to cause the robot to move away from the vehicle.

\* \* \* \* \*